(12) United States Patent
Mahadevaiah et al.

(10) Patent No.: US 12,476,860 B2
(45) Date of Patent: Nov. 18, 2025

(54) PRIORITY BASED SERVICE TO OVERCOME QAM OVERFLOW

(71) Applicant: ARRIS Enterprises LLC, Suwanee, GA (US)

(72) Inventors: Mohan Mahadevaiah, Mysore (IN); Srinivasan Odappan, Bengaluru (IN); Velusamy Pasuvagoundenpudur Vijayan, Bengaluru (IN); Pratap Doddi, Bengaluru (IN)

(73) Assignee: ARRIS Enterprises LLC, Horsham, PA (US)

( * ) Notice: Subject to any disclaimer, the term of this patent is extended or adjusted under 35 U.S.C. 154(b) by 376 days.

(21) Appl. No.: 18/103,258

(22) Filed: Jan. 30, 2023

(65) Prior Publication Data

US 2023/0246899 A1    Aug. 3, 2023

Related U.S. Application Data

(60) Provisional application No. 63/304,388, filed on Jan. 28, 2022.

(51) Int. Cl.
| | |
|---|---|
| G06F 15/173 | (2006.01) |
| H04L 27/36 | (2006.01) |
| H04L 47/24 | (2022.01) |
| H04L 47/2416 | (2022.01) |

(52) U.S. Cl.
CPC ............ H04L 27/364 (2013.01); H04L 47/24 (2013.01); H04L 47/2416 (2013.01)

(58) Field of Classification Search
None
See application file for complete search history.

(56) References Cited

U.S. PATENT DOCUMENTS

2009/0016218 A1 *  1/2009  Hong ................. H04L 47/10
                                                            370/231

OTHER PUBLICATIONS

Cisco Systems, Inc. "Maintaining and Troubleshooting QAM Devices in the DBDS Operation and Maintenance Guide", Published Sep. 2010, Lawrenceville, GA 30042.

\* cited by examiner

*Primary Examiner* — Wing F Chan
*Assistant Examiner* — Andrew Woo
(74) *Attorney, Agent, or Firm* — Chernoff, Vilhauer, McClung & Stenzel, LLP

(57) ABSTRACT

The present disclosure describes techniques for efficiently handling QAM overflow while transmitting online services. The QAM overflow indicates an instance when summation of the set of transmission data rates corresponding to the set of services exceeds threshold data rate. The techniques of present disclosure comprises monitoring transmission of the set of services having a corresponding set of transmission data rates and a corresponding set of transmission priorities, each service comprising a first set of data packets and a second set of data packets. The techniques further comprises preventing the QAM overflow by blocking transmission of at least one of first set of data packets and second set of data packets of one or more services, amongst the set of services, from lowest to highest transmission priority till a summation of transmission data rates of remaining services continued to be transmitted is less than or equal to a threshold data rate.

24 Claims, 6 Drawing Sheets

500

SBR – Service Bit Rate (Mbps)
OBR – Optional Bit Rate (Mbps)

Threshold date rate – 38.8 Mbps

| Services | Priority | SBR | SBR-OBR | OBR | Service State |
|---|---|---|---|---|---|
| Service S1 | P1 | 10 | 10-2=8 | 2 | ACTIVE |
| Service S2 | P2 | 20 | 20-4=16 | 4 | ACTIVE |
| *Service S3* | *P3* | *10* | *10-1=9* | *1* | *BLOCKED* |
| Service S4 | P4 | 5 | 5-2=3 | 2 | ACTIVE |
| *Service S5* | *P5* | *5* | *5-1=4* | *1* | *BLOCKED* |

Time Interval T1

| Services | Priority | SBR | SBR-OBR | OBR | Service State |
|---|---|---|---|---|---|
| Service1 | P1 | 10 | 10-2=8 | 2 | ACTIVE |
| Service2 | P2 | 20 | 20-4=16 | 4 | ACTIVE |
| Service3 | P3 | 8 | 8-1=7 | 1 | ACTIVE |
| *Service4* | *P4* | *5* | *5-2=3* | *2* | *BLOCKED* |
| *Service5* | *P5* | *5* | *5-2=3* | *2* | *BLOCKED* |

Time Interval T2

| Services | Priority | SBR | SBR-OBR | OBR | Service State |
|---|---|---|---|---|---|
| Service1 | P1 | 10 | 10-2=8 | 2 | ACTIVE |
| Service2 | P2 | 20 | 20-4=16 | 4 | ACTIVE |
| Service3 | P3 | 9 | 9-1=8 | 1 | ACTIVE_PARTIALLY |
| *Service4* | *P4* | *5* | *5-2=3* | *2* | *BLOCKED* |
| *Service5* | *P5* | *5* | *5-1=4* | *1* | *BLOCKED* |

Time Interval T3

| Services | Priority | SBR | SBR-OBR | OBR | Service State |
|---|---|---|---|---|---|
| Service1 | P1 | 10 | 10-2=8 | 2 | ACTIVE |
| Service2 | P2 | 20 | 20-4=16 | 4 | ACTIVE |
| *Service3* | *P3* | *10* | *10-1=9* | *1* | *BLOCKED* |
| Service4 | P4 | 5 | 5-2=3 | 2 | ACTIVE |
| *Service5* | *P5* | *5* | *5-2=3* | *2* | *ACTIVE_PARTIALLY* |

Time Interval T4

FIG. 5

PRIORITY BASED SERVICE TO OVERCOME QAM OVERFLOW

CROSS-REFERENCE TO RELATED APPLICATIONS

The present application claims priority to U.S. Provisional App. No. 63/304,388 filed Jan. 28, 2022, the contents of which are incorporated herein by reference in their entirety.

TECHNICAL FIELD

The present disclosure relates in general to service delivery in a cable network environment.

BACKGROUND

Service delivery in the entertainment industry be it movies, web series, television shows, or radio services has seen exponential growth in past decades, due for example to the wide availability of the Internet One widely used technique to modulate content provided to subscribers is Quadrature amplitude modulation (QAM), which allows convergence of various services from different service providers on a single platform for distribution to one or more subscribers. QAM modulation devices receive a multiprogram transport stream (MPTS) of different content "channels" via a packetized data stream, decode the stream into the different "channels" and modulate each of the channels onto respective frequency subcarriers that are delivered to subscribers over a content delivery network, which is usually either a coaxial network or a hybrid fiber-optic/coaxial network.

QAM modulation of an input MPTS may occur at any of several places in a content delivery network. Traditionally, QAM devices were located in a head end, which delivered the modulated signals to nodes via optical fiber, and the nodes converted the optical signal to an electrical signal for delivery to subscribers via coaxial cable. Recent distributed access (DAA) architectures, however, push the QAM modulation into the network such that the nodes perform the QAM modulation. Regardless of which architecture is employed, the QAM devices typically include an Ethernet interface to receive the incoming MPTS digitized stream and an output analog interface to deliver the modulated RF content channels to subscribers.

However, one technical challenge faced while distributing the services using the QAM technique is QAM overflow situation where spikes or fluctuations in the input stream exceed the ability of the QAM modulators to process the packetized program data into their separate modulated channels. This phenomenon, called QAM overflow, leads to disruptions in service spread randomly over all the channels of content being modulated, as input packets of content are simply dropped.

What is desired, therefore, are improved systems and methods to address data loss due to QAM overflow.

The information disclosed in this background section is only for enhancement of understanding of the general background of the invention and should not be taken as an acknowledgement or any form of suggestion that this information forms the prior art already known to a person skilled in the art.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. Some embodiments of system and/or methods in accordance with embodiments of the present subject matter are now described, by way of example only, and with reference to the accompanying figures, in which:

FIG. 5 shows an example of transmission of the services at different time intervals, in accordance with some embodiments of the present disclosure.

Figure 1:
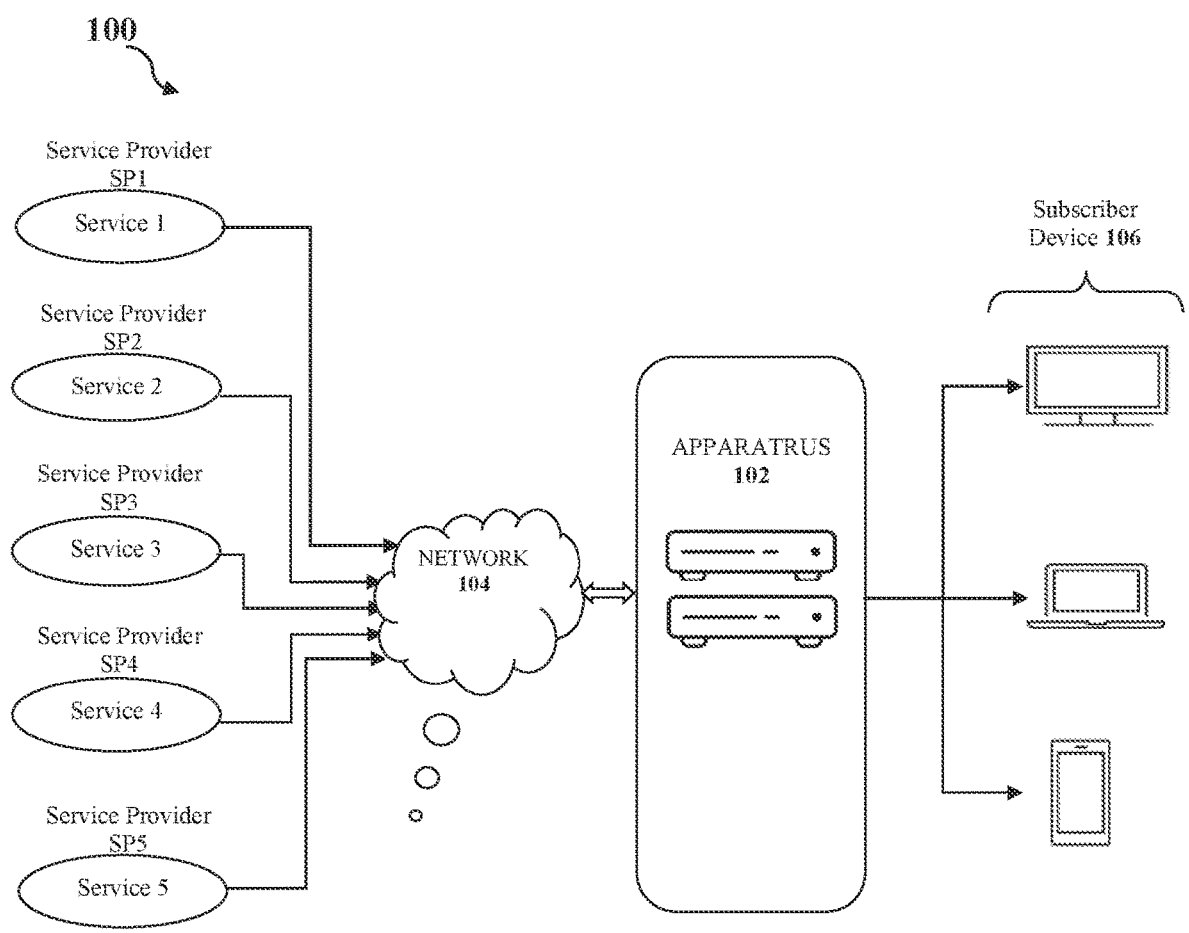
FIG. 1 shows an exemplary environment illustrating transmission of services, in accordance with some embodiments of the present disclosure.

It should be appreciated by those skilled in the art that any block diagram herein represent conceptual views of the illustrative system embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus proceeded by "comprises . . . a" does not, without more constraints, preclude the existence of other elements or additional elements in the system.

The terms like "at least one" and "one or more" may be used interchangeably or in combination throughout the description.

In the following detailed description of the embodiments of the disclosure, reference is made to the accompanying drawings that form a part hereof, and in which are shown specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

The present disclosure relates to a method, an apparatus, and a computer readable media for distributing services to subscribers in a network environment. Services may originate from service providers and may be sent to a headend device or other network device that produces QAM modulated signals (also referred as a QAM device in the present disclosure) for distribution to subscribers. The QAM device may process (e.g., encode, decode, modulate) incoming content services (e.g., television content, which may be one or more of video streams, audio tracks, subtitles, etc.) and may further distribute the services to the subscribers. Each service may have a corresponding transmission data rate i.e. bandwidth required for transmitting the service. Along with the transmission data rate, each service may also have a transmission priority indicating the importance of the service. With the knowledge of the transmission data rates and transmission priorities for various services, the apparatus of the present disclosure may be able to address the above discussed problem of QAM overflow. QAM overflow may occur when a summation of the transmission data rates of the incoming services become higher than a threshold data rate of the QAM device i.e., an amount of data rate capable of being handled by the QAM device.

The services may be continuously monitored while being transmitted to the subscribers. At any instance, the QAM device may detect the presence of QAM overflow and, when detected, may ameliorate its effects. To achieve this objective, some embodiments of the present disclosure may alternatively and selectively block or unblock one or more services. That is, the QAM device may block those services that have lower transmission priority relative to other services that have higher transmission priority. Services usually arrive as a sequence of data packets at the QAM device. Some embodiments of the disclosure may preferably categorize the data packets of each service into one or more priority levels, e.g., in a simple embodiment essential data packets and non-essential data packets. Other embodiments may include more gradations of priority levels. This information may further help the QAM device to apply the blocking and unblocking/allowing techniques at the data packet level as described later in this specification. This way, the embodiments disclosed in the present application not only distributes services based on their respective priorities, but also optimizes use of bandwidth.

According to some embodiments of present disclosure, these benefits may be achieved by selectively dropping (i.e., not QAM modulating) services that are lower in priority relative to other services, using priority attributers associated with those services, during instances when the apparatus is not capable of accommodating services of all priorities. Considering, for example, a situation where a QAM device receives an input of five services S1-S5 to modulate, where each service S1-S5 has a corresponding transmission data rate and a corresponding assigned priority. The services S1-S5 may be conceptually arranged in a highest to lowest priority order, where S1 has the highest priority and S5 has the lowest priority. It may happen that a summation of transmission data rate of a lower priority service S4 and transmission data rates of higher priority services S1-S3 goes beyond the threshold data rate i.e., a maximum data rate supported by the QAM device. In this situation, the QAM device may perform the analysis on the data packet level. The apparatus may first check if service S4 may be transmitted partially. For this, the apparatus may attempt transmitting essential data packets pertaining to service S4 and blocking non-essential data packets pertaining to service S4. If essential data packets of service S4 may be accommodated with data packets of already allowed services S1-S3, the apparatus may partially allow service S4. However, if the essential data packets pertaining to service S4 may not be accommodated with the data packets of services S1-S3, the apparatus may fully block service S4 and may attempt to transmit service S5 which has lower priority than service S4 along with higher priority services S1-S3. In this manner, the apparatus may block a higher priority service and transmit a lower priority service for optimizing bandwidth.

FIG. 1 shows an exemplary environment illustrating transmission of services in accordance with an embodiment of the present disclosure.

In a non-limiting embodiment, the environment 100 may include various service providers SP1-SP5, a network 104, an apparatus 102, and at least one subscriber device 106. The service providers SP1-SP5may provide services Service 1-Service 5 respectively. The services (Service 1-5) may include for example, video-on-demand, TV shows, movies, web series, live events, radio services and the like. Further, the network 104 may comprise a data network such as, but not restricted to, the Internet, Local Area Network (LAN), Wide Area Network (WAN), Metropolitan Area Network (MAN), etc. In certain embodiments, the network 104 may include a wireless network, such as, but not restricted to, a cellular network and may employ various technologies including Enhanced Data rates for Global Evolution (EDGE), General Packet Radio Service (GPRS), Global System for Mobile Communications (GSM), Internet protocol Multimedia Subsystem (IMS), Universal Mobile Telecommunications System (UMTS) etc. In one embodiment, the network 104 may include or otherwise cover networks or subnetworks, each of which may include, for example, a wired or wireless data pathway. The apparatus 102 may be a headend device or other network device, such as a device in a node that performs the physical layer processing in a Distributed Access Architecture, capable of receiving the services from the service providers and further processing and transmitting the services to the one or more subscribers after modulating the services on QAM channels. The apparatus 102 may also be implemented as any computing device having at least one processor and memory. Further, the subscriber device 106 may comprise any end user device such as, but not limited to, a cable modem, a set top box, a television, a smart television, a smartphone, a mobile phone, a personal digital assistant, a desktop computer, a laptop computer, a tablet device or any other type of computing device on which the services can be consumed.

The apparatus 102 may address QAM overflows, which generally occur due to fluctuation at the input at the apparatus 102. Conventionally, the apparatus 102 receives services via a GigE input and outputs QAM modulated channels or frequency carriers that contain those services. The GigE input refers to incoming data packets of the services in a packetized elementary stream and QAM output refers to the outgoing RF signal modulated such that the respective services are each contained in frequency bands of the spectrum of the RF signal, so that a receiver may reproduce a desired service by tuning to its associated frequency band, or "channel.". As noted previously, fluctuation of the packetized data into a QAM device will occasionally cause the amount of data input to exceed the threshold rate that the QAM device may modulate, which causes QAM overflow. Due to the QAM overflow, the outgoing QAM modulated RF signal will drop the data in a manner that is ordinarily distributed randomly across the services modulated on the signal. A skilled person may understand that all the services may not have the same priority. Some services may be more important than other services and thus may be given preference. For example, paid services may be given more preference over free services. Thus, higher priority services or premium services are ordinarily adversely affected by QAM overflow to the same extent as lower priority services or content, thereby providing inconvenience to the subscribers.

Figure 2:
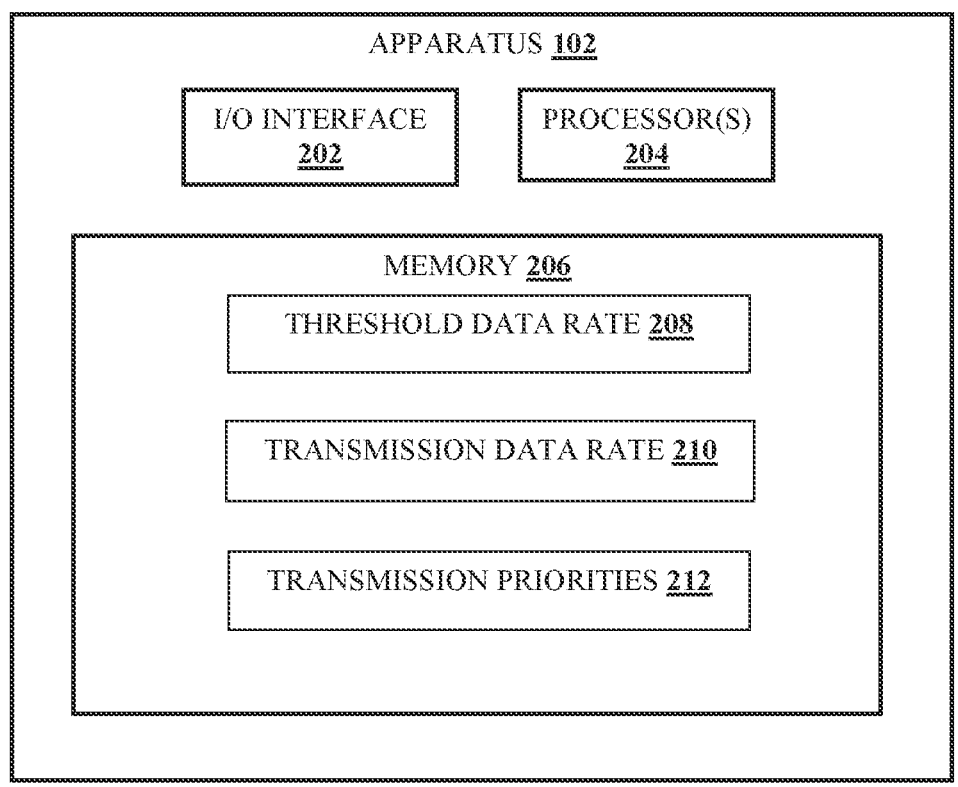
FIG. 2 shows a detailed block diagram illustrating an apparatus, in accordance with some embodiments of the present disclosure.

FIG. 2 shows a detailed block diagram 200 illustrating the apparatus 102 in accordance with some embodiments of the present disclosure. The apparatus 102 may comprise an I/O interface 202, at least one processor 204, and a memory 206. The I/O interface 202 may be configured to receive the set of services from the service providers and transmit the set of services to the subscribers. The memory 206 may be communicatively coupled to the at least one processor 204 and may store the threshold data rate 208 of the apparatus 102 i.e., the maximum data rate at which the apparatus 102 may modulate incoming data onto a QAM output. The memory 206 may also store a measured transmission data rate 210 and transmission priorities 212 for each of the incoming services. The at least one processor 204 may be configured to perform one or more functions of the apparatus 102 as described in the present disclosure.

As the set of services are received from different service providers, they may be of different types and may have different transmission priorities 212. For example, service S1 may have highest transmission priority and service S5 may have lowest transmission priority. According to an embodiment of the present disclosure, the transmission priorities 212 may be assigned to the services based on various priority parameters including, but not limited to, service type, viewer statistics, service resolution, and service language. For example, the service type may define whether the service is a video service or a radio service or any other type of service. The viewer statistics may indicate Television Rating Point (TRP) of a service which defines the popularity of the service. The service resolution may define streaming format of the service, for example, Standard Definition (SD), High Definition (HD), Full High Definition (FHD), Ultra High Definition (UHD), or 4K resolution. These streaming formats may differ in their number of pixels. For example, UHD may have higher number of pixels as compared to FHD, HD, and SD. Using resolution as one of the priority parameters gives more flexibility in prioritizing the services. For example, a service providing the same content at multiple different resolutions such as SD/HD/FHD/UHD/4K may prioritize some resolution(s) relative to others. The same may be true with respect to differing audio tracks of varying quality. The service language parameter may provide information about different languages in which the services are provided. The service language parameter may help in prioritizing the services based on preferred language which is mostly viewed in a specific geographical region or in a specific group. For example, local or native languages of any region may be given high priority over foreign languages.

As the stream of services into the QAM device comprises data packets, some embodiments of the present disclosure may preferably categorize the data packets within each service into the first set of data packets and the second set of data packets. According to an embodiment, the first set of data packets may comprise essential data packets and the second set of data packets may comprise non-essential data packets. Hereinafter, the terms "first set of data packets" and "essential data packets" may be interchangeably used. Also, the terms "second set of data packets" and "non-essential data packets" may be interchangeably used. Considering an example of an English TV show streaming with Spanish subtitles in USA, which is mostly an English-speaking country. In this case, the data packets corresponding to the "Spanish subtitles" may be categorized as the non-essential data packets as Spanish language may not be a preferred language in the USA, and hence may be dropped.

The transmission priorities 212 may be assigned to the services either by the services providers or by an operator operating the QAM device in real time. A service provider may indicate a transmission priority for a particular service in at least one of the first set of data packets and the second set of data packets pertaining to the service. In this scenario, at least one of the first set of data packets and the second set of data packets may comprise at least one descriptor indicative of the transmission priority. According to an embodiment, the descriptor may be provided as a Program and Elementary Stream Descriptor Tag of incoming Program Mapping Table (PMT) associated with a particular service. Further, the descriptor tag may be defined according to standards defined by ITU-T Rec. H.262, ISO/IEC 13818-2, or ISO/IEC 11172-2. An example of the descriptor is shown below.

TABLE 1

| Syntax | No. of bits | Mnemonic |
| --- | --- | --- |
| program_priority_descriptor ( ) { | | |
| descriptor tag | 8 | uimsbf |
| descriptor_length | 8 | uimsbf |
| program_priority | 8 | uimsbf |
| } | | |

In the above table the 8-bit field may indicate the priority of the service. The value 0 means lowest priority and 255 means highest priority. From the above it may be understood that the data packets of the incoming services already have their transmission priorities 212 preassigned. However, according to another embodiment of the present disclosure, the transmission priorities 212 may be assigned by the operator in real time after the services have arrived at the apparatus 102.

From the above discussion, it may be understood that preferred embodiments may implement a two-tier classification system, meaning that there are two hierarchical levels of categorization. First, services are categorized based on their transmission priorities 212. In this context, a "service" comprises a program or other type of content, which itself may be composed of ancillary services such as subtitles, audio tracks, different resolutions of video, Event Information Tables (EIT) associated with the program or other content, Extended Text Tables (ETT) associated with the program or other content, etc. In some embodiments, categorization of services at this first level may be predefined by the operator of the QAM device, may be retrieved from the descriptor tags of the packets in the PES as described above, or may be categorized using a combination of these two methods. For example, the QAM device may be configured with default priorities for the received services. Should the incoming PES include priority data in the descriptors of its packets, in some embodiments this priority data may override the default priorities set by the operator. In other embodiments, the QAM device may be configured to ignore priorities specified in the descriptors of the PES and instead always use its own default priorities.

At the second level of categorization, each service may be further categorized into essential data packets and non-essential data packets. In some embodiments, this may be performed by the operator of the QAM device classifying each ancillary service, for any given service as being either essential or non-essential. For example, EIT tables and ETT tables associated with all services may be classified as non-essential while low quality video streams and stereo audio streams are classified as essential. Those of ordinary skill in the art will realize that this classification may distinguish between services, meaning for example that a high definition video stream, or a DTS audio track for one service may be classified as essential while these same ancillary services may be classified as non-essential for other services. Moreover, this second level classification may be implemented with greater granularity than simply a binary choice between "essential" and "non-essential." Because the PES input to the QAM device includes information in each packet specifying the service and ancillary services associated with the data in the packet, this two-tier categorization enables the QAM device to easily drop lower priority services when needed, as well as to only drop non-essential packets within a service while processing an modulating essential packets.

Figure 4:
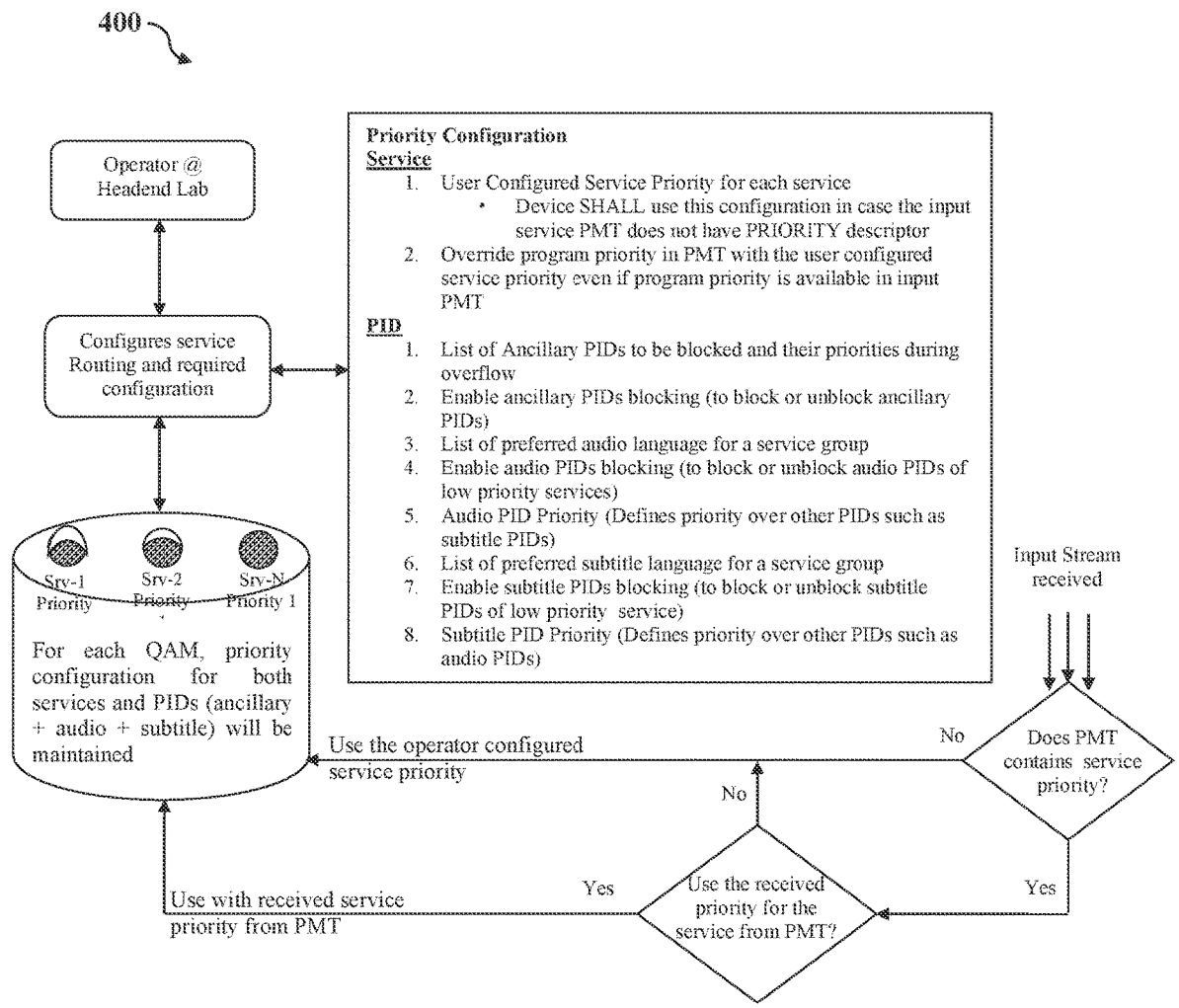
FIG. 4 shows an exemplary configuration for managing priority attributes of services modulated by a QAM device.

FIG. 4 generally illustrates the two-tier categorization system just described. Using two levels of categorization provides better flexibility in transmitting the services either fully or partially while dealing with QAM overflow. In this manner, services may be transmitted based on their priorities within the limited available bandwidth.

The detailed working of the apparatus 102 may be been explained using an example embodiment 500 shown in FIG. 5. The at least one processor 204 may monitor the transmission of the services S1-S5, in which service S1 has highest transmission priority P1 and service S5 has the lowest transmission priority P5. The services may be prioritized such that P1>P2>P3>P4>P5. The transmission priorities 212 of the services are indicated in FIG. 5. FIG. 5 also illustrates bit rate information i.e., service bit rate (SBR) and optional bit rate (OBR) corresponding to each service. The SBR may refer to transmission data rate 210 that indicates a "total bit rate" required for transmitting the entire service. That is, SBR for a particular service may indicate the transmission data rate 210 required for transmitting the essential data packets and non-essential data packets of that service. Whereas, OBR for a particular service may indicate the bit rate required for transmitting only the optional or "non-essential data packets" of the service. Further, the column "SBR-OBR" therefore indicates the bit rate required for transmitting only the "essential data packets" of the service. The values given under the SBR, OBR and SBR-OBR are in Mbps. For example, at time interval 1, service S1 has SBR of 10 Mbps and OBR of 2 Mbps. This may mean that the service S1 requires (i.e., SBR-OBR→10−2=8 Mbps) bit rate for transmission of its essential data packets and requires 2 Mbps for transmission of its optional or non-essential data packets.

At Time Interval T1

At T1, the at least one processor 204 may determine the summation of the SBRs for the services S1-S5 (10+20+10+5+5=50 Mbps) and may compare the summation of the SBRs with the threshold data rate of the apparatus 102. The "threshold data rate" may define a maximum data rate up to which data packets may be transmitted from the apparatus 102. This maximum rate may vary based on configuration of the apparatus 102. For example, the apparatus 102 supporting 64 QAM may have the threshold data rate 208 of approximately 26.9 Mbps. Whereas the apparatus 102 supporting 256 QAM may have the threshold data rate 208 of approximately 38.8 Mbps. In other words, the apparatus supporting the 256 QAM have more transmit power than the apparatus supporting 64 QAM. In the example shown in FIG. 5, the threshold data rate 208 of the apparatus 102 has been considered as "38.8 Mbps".

The at least one processor 204 may detect the occurrence of QAM overflow since the summation of the SBRs i.e. 50 Mbps is greater than the threshold data rate i.e. 38.8 Mbps. In response, the at least one processor 204 may attempt to transmit the higher priority services and block the lower priority services. The at least one processor 204 may start from the highest priority service S1, followed by service S2 and so on. The at least one processor 204 may transmit the higher priority services until the summation of their SBRs is less than or equal to the threshold data rate of 38.8 Mbps.

For example, the at least one processor 204 may allow the transmission of higher priority services S1 and S2 as the summation of their SBRs (10+20=30 Mbps) is less than the threshold data rate 208 of 38.8 Mbps. The at least one processor 204 may then attempt to transmit the next priority service S3 along with services S1 and S2. At T1, the at least one processor 204 may block the transmission of service S3 as the summation of SBRs of services S1, S2 and S3 (10+20+10=40 Mbps) exceeds the threshold data rate 208 of 38.8 Mbps i.e., 40>38.8, thus again leading to the QAM overflow. In response, the at least one processor 204 may attempt to partially transmit service S3. That is, the at least one processor 204 may look for a possibility of transmitting only the essential data packets of service S3 and may block the non-essential data packets of service S3. The at least one processor 204 may again determine the summation of SBRs of services S1, S2 with (SBR-OBR) of service S3 which is (10+20+9=39 Mbps). The at least one processor 204 may further compare the summation of SBRs of services S1, S2 with (SBR-OBR) of service S3 with the threshold data rate 208 and may determine that the summation still exceeds the threshold data rate 208 of 38.8 Mbps i.e., 39>38.8. Thus, the at least one processor 204 may not transmit service S3 even partially and may block S3.

After blocking service S3, the at least one processor 204 may then attempt to transmit the next priority service S4 along with services S1 and S2. At T1, the at least one processor 204 may allow the transmission of service S4 as the summation of SBRs of services S1, S2 and S4 (10+20+5=35 Mbps) is less than the threshold data rate 208 of 38.8 Mbps i.e., 35<38.8. The at least one processor 204 may now attempt to transmit service S5 along with services S1, S2 and S4. At T1, the at least one processor 204 may block the transmission of service S5 as the summation of SBRs of services S1, S2, S4 and S5 (10+20+5+5=40 Mbps) exceeds the threshold data rate 208 of 38.8 Mbps i.e., 40>38.8, thus again leading to the QAM overflow. In response, the at least one processor 204 may attempt to partially transmit service S5. That is, the at least one processor 204 may look for a possibility of transmitting only the essential data packets of service S5 and may block the non-essential data packets of service S5. The at least one processor 204 may now determine the summation of SBRs of services S1, S2, S4 with (SBR-OBR) of service S5 which is (10+20+5+4=39). The at least one processor 204 may further compare the summation of SBRs of services S1, S2, S4 with (SBR-OBR) of service S5 with the threshold data rate 208 and may determine that the summation exceeds the threshold data rate of 38.8 Mbps i.e., 39>38.8. Thus, the at least one processor 204 may not transmit service S5 even partially and may block S5. In this manner, the at least one processor 204 may efficiently manage the transmission of the services and allow even the lower priority services to optimize the bandwidth.

At Time Interval T2

At T2, the at least one processor 204 may determine the summation of the SBRs for the services S1-S5 (10+20+8+5+5=48 Mbps) and may compare the summation of the SBRs with the threshold data rate 208 of the apparatus 102. The at least one processor 204 may detect the occurrence of QAM overflow, since the summation of the SBRs i.e. 48 Mbps is greater than the threshold data rate 208 i.e. 38.8 Mbps. In response, the at least one processor 204 may allow the transmission of higher priority services S1, S2 and S3 as the summation of their SBRs (10+20+8=38 Mbps) is less than the threshold data rate 208 of 38.8 Mbps. The at least one processor 204 may then attempt to transmit the next priority service S4 along with services S1, S2 and S3. At T2, the at least one processor 204 may block the transmission of service S4 as the summation of SBRs of services S1, S2, S3 and S4 (10+20+8+5=43 Mbps) exceeds the threshold data rate 208 of 38.8 Mbps i.e., 43>38.8, thus again leading to QAM overflow. In response, the at least one processor 204 may attempt to partially transmit service S4 by transmitting only essential data packets of service S4. The at least one processor 204 may determine the summation of SBRs of services S1, S2, S3 with (SBR-OBR) of service S4 which is (10+20+8+3=41 Mbps). The at least one processor 204 may further compare the summation of SBRs of services S1, S2, S3 with (SBR-OBR) of service S4 with the threshold data rate and may determine that the summation still exceeds the threshold data rate of 38.8 Mbps i.e., 41>38.8. Thus, the at least one processor 204 may not transmit service S4 even partially and may block S4.

After blocking service S4, the at least one processor 204 may then attempt to transmit the next priority service S5 along with services S1, S2 and S3. At T2, the at least one processor 204 may block the transmission of service S5 as the summation of SBRs of services S1, S2, S3 and S5 (10+20+8+5=43 Mbps) exceeds the threshold data rate 208 of 38.8 Mbps i.e., 43>38.8, thus again leading to QAM overflow. In response, the at least one processor 204 may attempt to partially transmit service S5 by transmitting only essential data packets of service S5. The at least one processor 204 may determine the summation of SBRs of services S1, S2, S3 with (SBR-OBR) of service S5 which is (10+20+8+3=41 Mbps). The at least one processor 204 may further compare the summation of SBRs of services S1, S2, S3 with (SBR-OBR) of service S5 with the threshold data rate 208 and may determine that the summation still exceeds the threshold data rate 208 of 38.8 Mbps i.e., 41>38.8. Thus, the at least one processor 204 may not transmit service S5 even partially and may block S5.

At Time Interval T3

At T3, the at least one processor 204 may determine the summation of the SBRs for the services S1-S5 (10+20+9+5+5=49 Mbps) and may compare the summation of the SBRs with the threshold data rate 208 of the apparatus 102. The at least one processor 204 may detect the occurrence of QAM overflow, since the summation of the SBRs i.e., 49 Mbps is greater than the threshold data rate i.e., 38.8 Mbps. In response, the at least one processor 204 may allow the transmission of higher priority services S1 and S2 as the summation of their SBRs (10+20=30 Mbps) is less than the threshold data rate 208 of 38.8 Mbps. The at least one processor 204 may then attempt to transmit the next priority service S3 along with services S1 and S2. At T2, the at least one processor 204 may block the transmission of service S3 as the summation of SBRs of services S1, S2 and S3 (10+20+9=39 Mbps) exceeds the threshold data rate 208 of 38.8 Mbps i.e., 39>38.8, thus again leading to QAM overflow. In response, the at least one processor 204 may attempt to partially transmit service S3 by transmitting only essential data packets of service S3. The at least one processor 204 may determine the summation of SBRs of services S1 and S2 with (SBR-OBR) of service S3 which is (10+20+8=38 Mbps). The at least one processor 204 may further compare the summation of SBRs of services S1 and S2 with (SBR-OBR) of service S3 with the threshold data rate 208 and may determine that the summation is less than the threshold data rate 208 of 38.8 Mbps i.e., 38<38.8. Thus, the at least one processor 204 may partially transmit service S3. That is, the at least one processor 204 may transmit only essential data packets of service S3.

After partially transmitting service S3, the at least one processor 204 may then attempt to transmit the next priority service S4. The at least one processor may block the transmission of service S4 as the SBR of S4 combined with SBRs of S1-S2 and (SBR-OBR) of S3 exceeds the threshold data rate. Even the essential data packets of service S4 does not comply with the threshold data rate 208 and service S4 may not even be partially transmitted. Similar is the case with service 5. Service 5 may also be fully blocked considering the above discussed approach.

At Time Interval T4

At T4, the at least one processor 204 may transmit the higher priority services S1 and S2 and may block transmission of service S3. Even the essential data packets of S3 does not comply with the threshold data rate 208 and thus S3 may be fully blocked. Further, service S4 may be transmitted fully and service S5 may be transmitted partially.

From the above discussed example provided for time intervals T1-T4, it may be observed that the at least one processor 204 allows transmission of higher priority services during periods of QAM overflow by fully or partially blocking transmission of lower priority services. Once the services are blocked at certain time interval, the at least one processor 204 reevaluates the necessity of blocking services, and even when still needed, adjusts the services blocked to as to accommodate changes in an amount by which the rate of incoming data exceeds available bandwidth. Further, it may be understood to a person skilled in the art that the above discussed example is merely for explaining the present invention, and therefore scope of the present invention should not be limited with the given example. There may be different permutation and combination, in which, the at least one processor 204 may block and allow the essential and non-essential data packets. For example, it may happen that the essential and non-essential data packets may be prioritized for each service. In that case, if the service cannot be transmitted even after blocking the non-essential data packets, there may be an option to block some of essential data packets as well based on their priority.

Figure 3:
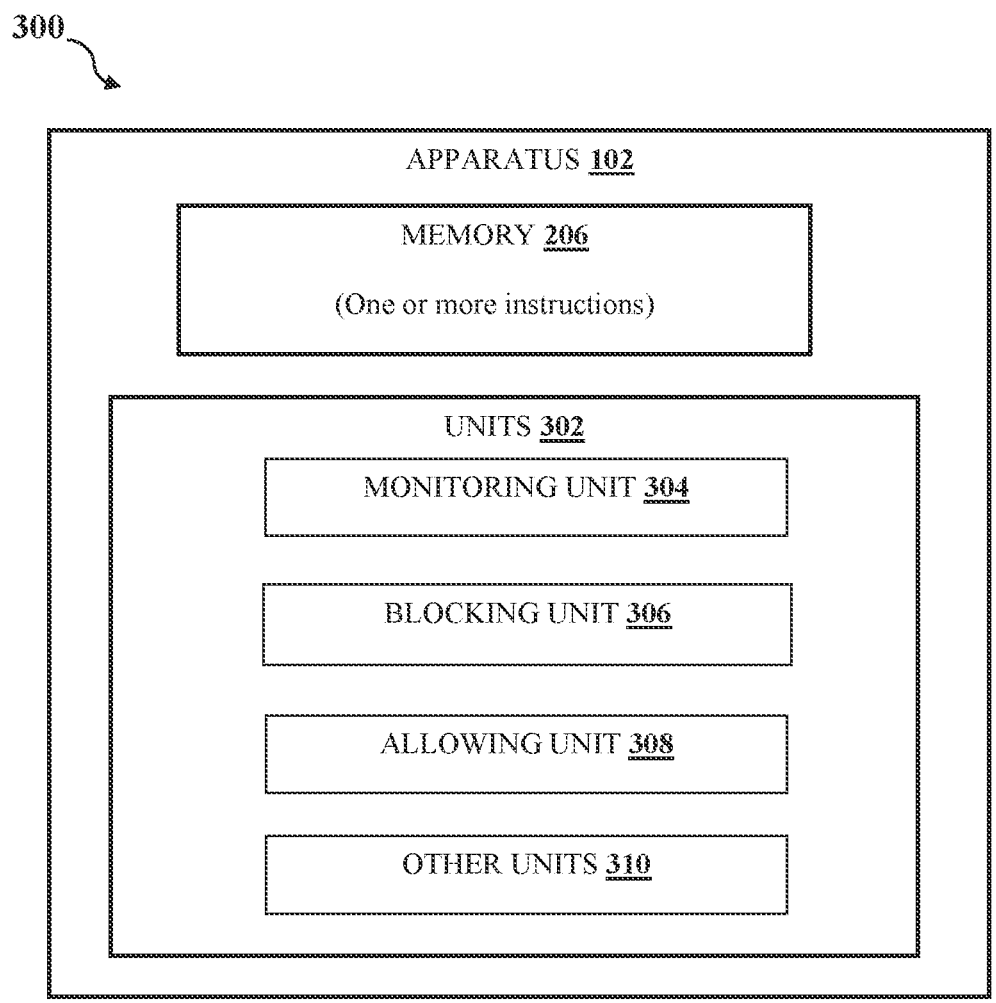
FIG. 3 shows another block diagram illustrating an apparatus, in accordance with some embodiments of the present disclosure.

In another non-limiting embodiment of the present disclosure, the apparatus 102 may comprise various units or means as shown in FIG. 3. The units 302 may comprise a monitoring unit 304, a blocking unit 306, an allowing unit 308, and other units 310. The other units 310 may perform operations like encoding, decoding and any other operation of the apparatus 102. In an embodiment, the units 302-310 may be dedicated hardware units capable of executing one or more instructions stored in the memory 310 for performing various operations of the apparatus 102. In another embodiment, the units 302-310 may be software modules stored in the memory 206 which may be executed by the at least one processor 204 for performing the operations of the apparatus 102.

Figure 6:
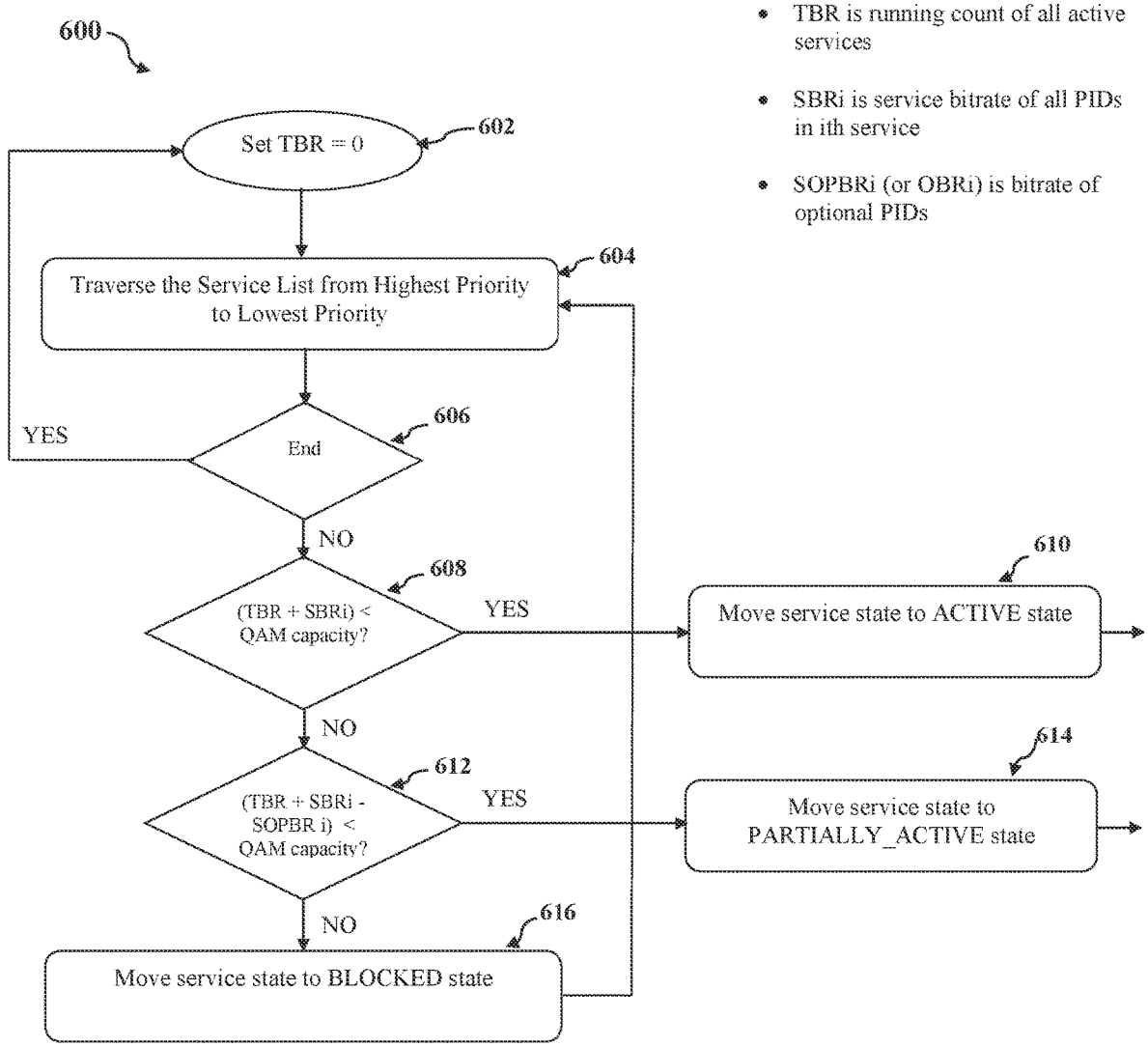
FIG. 6 shows a flowchart illustrating a method of transmission of services, in accordance with some embodiments of the present disclosure.

FIG. 6 shows a flowchart illustrating a method of transmitting the services with some embodiments of the present disclosure.

As illustrated in FIG. 6, the method 600 comprises one or more blocks for transmitting the services using an apparatus 102. The method 600 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

The method includes a logic of blocking and unblocking of the services. Initially, transmission of all the services will be allowed until QAM overflow is detected. Once the QAM overflow is detected, the method includes determining the possibility of transmitting high priority services over low priority services.

At block 602, the method includes setting the total bit rate (TBR) to zero "0". The TBR indicates the running count of all the active services i.e., the services that are allowed to be transmitted from the QAM device to the subscriber devices.

At block 604, the method includes traversing the service list from highest priority to lowest priority once the QAM overflow is detected. The traversing of the service list is done based on priority assigned to the services.

At block 606, the method includes determining whether any service is left for transmitting. If no service is remaining, TBR remains zero "0". However, if any service is left to be transmitted (which may be a blocked service), the method checks the possibility of transmitting the service either fully or partially.

At block 608, the method includes determining whether the summation of bitrate (TBR) of the ongoing services and bitrate (SBRi) of all the PIDs in the ith service (which is to be transmitted along with the ongoing services) is less than the QAM capacity. The QAM capacity is the "threshold data rate" which is a maximum data rate up to which data packets may be transmitted from the apparatus 102.

At block 610, the method includes moving the "ith service" to an ACTIVE state when it is determined that the summation of the bitrate (TBR) of the ongoing services and bitrate (SBRi) of all the PIDs in the ith service is less than the QAM capacity. That is, the apparatus 102 has the bandwidth available for accommodating the "ith service" along with the ongoing services for transmitting to the subscribers. However, if all the PIDs of the "ith service" cannot be accommodated in the available bandwidth, the method moves to the block 612.

At block 612, the method includes determining whether the summation of bitrate (TBR) of the ongoing services and bitrate (SBRi-SOPBRi) of "essential" PIDs in the ith service is less than the QAM capacity. SBRi indicates the bitrate of all the PIDs of the ith service, whereas the SOPBRi indicates the "optional" PIDs of the ith service. By subtracting SOPBRi from SBRi (i.e. SBRi-SOPBRi), the method determines a possibility of transmitting only essential PIDs (if not all) of the ith service along with the ongoing services to optimize the use of the bandwidth.

Thus, at block 614, the method includes moving the "ith service" to a PARTIALLY_ACTIVE state when it is determined that the summation of the bitrate (TBR) of the ongoing services and the bitrate (SBRi-SOPBRi) of the "essential" PIDs in the ith service is less than the QAM capacity. In other words, instead of entirely blocking the ith service, the apparatus 102 transmits the essential PIDs of the "ith service" along with the ongoing services to the subscribers, thereby optimizing the use of the bandwidth.

At block 616, the method includes moving the ith service to the blocked state if the summation of the bitrate (TBR) of the ongoing services and the bitrate (SBRi-SOPBRi) of the "essential" PIDs in the ith service is not less than the QAM capacity. That is, the apparatus 102 may not transmit ith service even partially and may block it. Once the service is blocked, the method again moves back to the block 604 to reevaluate the possibility of allowing the service along with the ongoing services.

In some situations, conflicts between service priorities may exist, meaning that two different services may be assigned the same numerical priority, where all services with higher priority may be transmitted within available bandwidth. In such a circumstance, the conflict must be resolved to determine which conflicting service will be evaluated first to determine whether it may be fully, or partially processed. In one preferred embodiment, within the group of services having the same numerical priority, priority may be awarded to the service flow configured with the earliest time stamp. Those of ordinary skill in the art will appreciate that other tie-breaking procedures may be used. For example, within the group of service flows assigned the same numerical priority, those having the smallest service bitrate may be prioritized over others. If two such services have identical service bitrates, the one with the largest optional bitrate may be prioritized, etc.

Those of ordinary skill in the art will appreciate that alternate prioritization schemes may readily be accomplished. For example, the embodiments previously described fully transmitted a service whenever (1) all other services higher in priority were fully processed and (2) the service could be fully processed within the available bandwidth capacity of the QAM device. This is accomplished using the two-tier priority system described above where the first-tier service priorities are evaluated first, and then the second-tier priorities assigned to ancillary services (e.g., essential and non-essential packets) evaluated to determine whether a relatively high priority service could be partially transmitted before evaluating lower priority services. This hierarchy could be reversed, meaning that whenever the occurrence of QAM overflow is detected, the lowest priority ancillary service (e.g., subtitles, EIT tables, etc.) is selected for consideration, and such ancillary services are dropped successively, in order of service priority from low to high, until the QAM overflow is eliminated. If necessary, the next highest priority ancillary service could be selected, and the process repeated. Such a procedure prioritizes processing all services at least in some manner at the expense of perhaps dropping ancillary services across-the board. In still another implementation, only a one-tier priority system may be adopted, where each ancillary service is assigned its own numerical priority by the operator of the QAM device. Such a system could achieve a hybrid implementation of the two approaches just discussed where, for example, the highest priority services are prioritized in their entirety while lower priority services are treated generally as a group, such that they together drop identical or similar ancillary services, so as to maximize the likelihood that all services will be at least partially processed while also maximizing the likelihood that the highest priority services will be fully processed.

In a non-limiting embodiment of the present disclosure, one or more non-transitory computer-readable media may be utilized for implementing the embodiments consistent with the present invention. A computer-readable media refers to any type of physical memory (such as the memory 206) on which information or data readable by a processor may be stored. Thus, a computer-readable media may store one or more instructions for execution by the at least one processor 204, including instructions for causing the at least one processor 204 to perform steps or stages consistent with the embodiments described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Thus, certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

The various illustrative logical blocks, modules, and operations described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may include a microprocessor, but in the alternative, the processor may include any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

As used herein, a phrase referring to "at least one" or "one or more" of a list of items refers to any combination of those items, including single members. As an example, "at least one of: a, b, or c" is intended to cover: a, b, c, a-b, a-c, b-c, and a-b-c. The terms "a", "an" and "the" mean "one or more", unless expressly specified otherwise.

The terms "an embodiment", "embodiment", "embodiments", "the embodiment", "the embodiments", "one or more embodiments", "some embodiments", and "one embodiment", "other embodiment", "yet another embodiment", "non-limiting embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

A description of an embodiment with several components in communication with each other does not imply that all such components are required. On the contrary, a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the appended claims.

REFERRAL NUMERALS

| Reference Number | Description |
|---|---|
| 100 | ENVIRONMENT |
| 102 | APPARATUS |
| 104 | NETWORK |
| 106 | SUBSCRIBER DEVICES |
| 200 | BLOCK DIAGRAM OF APPARATUS |
| 202 | I/O INTERFACE |
| 204 | PROCESSOR |
| 206 | MEMORY |
| 208 | THRESHOLD DATA RATE |
| 210 | TRANSMISSION DATA RATE |
| 212 | TRANSMISSION PRIORITIES |
| 300 | BLOCK DIAGRAM OF APPARATUS |
| 304 | MONITORING UNIT |
| 306 | BLOCKING UNIT |
| 308 | ALLOWING UNIT |
| 310 | OTHER UNITS |

The invention claimed is:

1. A method comprising:
 monitoring transmission of a set of services having a corresponding set of transmission data rates and a corresponding set of transmission priorities, each service of the set of services comprising a first set of data packets and a second set of data packets; and
 preventing QAM overflow during the transmission of the set of services, by:
  blocking transmission of at least one of the first set of data packets and the second set of data packets of one or more services, among the set of services, from lowest to highest transmission priority until a summation of transmission data rates of remaining services continued to be transmitted is less than or equal to a threshold data rate.

2. The method of claim 1, wherein the remaining services continued to be transmitted have higher transmission priorities than the one or more services being blocked.

3. The method of claim 1, further comprising:
allowing at least one of the first set of data packets and the second set of data packets of the one or more services being blocked from highest to lowest transmission priority when a summation of transmission data rates of the one or more services being blocked and the transmission data rates of the remaining services continued to be transmitted is less than or equal to the threshold data rate.

4. The method of claim 1, wherein, for each service of the set of services, the first set of data packets comprises essential data packets and the second set of data packets comprises non-essential data packets.

5. The method of claim 1, wherein for each service of the set of services, the corresponding transmission priority is defined in at least one of the first set of data packets and the second set of data packets.

6. The method of claim 5, wherein the at least one of the first set of data packets and the second set of data packets each comprises at least one descriptor indicative of its corresponding transmission priority.

7. The method of claim 1, wherein for each service of the set of services, the corresponding transmission priority is defined in real time during the transmission.

8. The method of claim 1, wherein the corresponding set of transmission priorities are assigned to the set of services based on priority parameters comprising at least one of service type, viewer statistics, service resolution, and service language.

9. An apparatus comprising:
a memory; and
at least one processor configured to:
monitor transmission of a set of services having a corresponding set of transmission data rates and a corresponding set of transmission priorities, each service of the set of services comprising a first set of data packets and a second set of data packets; and
prevent QAM overflow during the transmission of the set of services, by blocking transmission of at least one of first set of data packets and second set of data packets of one or more services, among the set of services, from lowest to highest transmission priority until a summation of transmission data rates of remaining services continued to be transmitted is less than or equal to a threshold data rate.

10. The apparatus of claim 9, wherein the remaining services continued to be transmitted have higher transmission priorities than the one or more services being blocked.

11. The apparatus of claim 9, wherein the at least one processor is further configured to:
allow at least one of the first set of data packets and the second set of data packets of the one or more services being blocked from highest to lowest transmission priority when a summation of transmission data rates of the one or more services being blocked and the transmission data rates of the remaining services continued to be transmitted is less than or equal to the threshold data rate.

12. The apparatus of claim 9, wherein for each service of the set of services, the first set of data packets comprises essential data packets and the second set of data packets comprises non-essential data packets.

13. The apparatus of claim 9, wherein for each service of the set of services, the corresponding transmission priority is defined in at least one of the first set of data packets and the second set of data packets.

14. The apparatus of claim 13, wherein the at least one of the first set of data packets and the second set of data packets comprises at least one descriptor indicative of the transmission priority.

15. The apparatus of claim 9, wherein for each service of the set of services, the corresponding transmission priority is defined in real time during the transmission.

16. The apparatus of claim 9, wherein the set of transmission priorities are assigned to the set of services based on priority parameters comprising at least one of service type, viewer statistics, service resolution, and service language.

17. A non-transitory computer readable media storing one or more instructions executable by at least one processor, the one or more instructions comprising:
one or more instructions for monitoring transmission of a set of services having a corresponding set of transmission data rates and a corresponding set of transmission priorities, each service of the set of services comprising a first set of data packets and a second set of data packets; and
one or more instructions for preventing QAM overflow during the transmission of the set of services, by:
blocking transmission of at least one of first set of data packets and second set of data packets of one or more services, among the set of services, from lowest to highest transmission priority until a summation of transmission data rates of remaining services continued to be transmitted is less than or equal to a threshold data rate.

18. The non-transitory computer readable media of claim 17, wherein the remaining services continued to be transmitted have higher transmission priorities than the one or more services being blocked.

19. The non-transitory computer readable media of claim 17, wherein the one or more instructions further comprise:
one or more instructions for allowing at least one of the first set of data packets and the second set of data packets of the one or more services being blocked from highest to lowest transmission priority when a summation of transmission data rates of the one or more services being blocked and the transmission data rates of the remaining services continued to be transmitted is less than or equal to the threshold data rate.

20. The non-transitory computer readable media of claim 17, wherein, for each service of the set of services, the first set of data packets comprises essential data packets and the second set of data packets comprises non-essential data packets.

21. The non-transitory computer readable media of claim 17, wherein for each service of the set of services, the corresponding transmission priority is defined in at least one of the first set of data packets and the second set of data packets.

22. The non-transitory computer readable media of claim 21, wherein the at least one of the first set of data packets and the second set of data packets comprises at least one descriptor indicative of the transmission priority.

23. The non-transitory computer readable media of claim 17, wherein for each service of the set of services, the corresponding transmission priority is defined in real time during the transmission.

24. The non-transitory computer readable media of claim 17, wherein the set of transmission priorities are assigned to the set of services based on priority parameters comprising at least one of service type, viewer statistics, service resolution, and service language.

* * * * *